(12) United States Patent
Fuwa (10) Patent No.: US 8,221,850 B2
(45) Date of Patent: Jul. 17, 2012

(54) MANUFACTURING METHOD OF THREE-DIMENSIONALLY SHAPED OBJECT

(75) Inventor: Isao Fuwa, Osaka (JP)

(73) Assignee: Panasonic Corporation, Osaka (JP)

( * ) Notice: Subject to any disclaimer, the term of this patent is extended or adjusted under 35 U.S.C. 154(b) by 659 days.

(21) Appl. No.: 12/519,638

(22) PCT Filed: Dec. 25, 2007

(86) PCT No.: PCT/JP2007/074853
§ 371 (c)(1),
(2), (4) Date: Jun. 17, 2009

(87) PCT Pub. No.: WO2008/081784
PCT Pub. Date: Jul. 10, 2008

(65) Prior Publication Data
US 2010/0034982 A1 Feb. 11, 2010

(30) Foreign Application Priority Data
Dec. 22, 2006 (JP) .................................. 2006-346498

(51) Int. Cl.
*C08J 7/18* (2006.01)
*B22F 7/00* (2006.01)
*B29C 35/04* (2006.01)
*B29C 35/06* (2006.01)

(52) U.S. Cl. ............. 427/554; 419/5; 264/401; 264/497

(58) Field of Classification Search .................. 427/551, 427/554, 555, 556, 558, 559
See application file for complete search history.

(56) References Cited

U.S. PATENT DOCUMENTS

| 6,054,003 A * | 4/2000 | Bak et al. ....................... 156/180 |
| 2002/0041818 A1* | 4/2002 | Abe et al. ........................... 419/7 |
| 2004/0099996 A1* | 5/2004 | Herzog ........................ 264/401 |
| 2004/0228754 A1 | 11/2004 | Abe et al. |
| 2005/0029711 A1 | 2/2005 | Abe et al. |
| 2007/0252309 A1 | 11/2007 | Higashi et al. |

FOREIGN PATENT DOCUMENTS

| JP | 11-10667 | 1/1999 |
| JP | 2004-284346 | 10/2004 |
| JP | 2005-48234 | 2/2005 |

OTHER PUBLICATIONS

English language Abstract of JP 2004-284346, Oct. 14, 2004.
English language Abstract of JP 11-10667, Jan. 19, 1999.
English language Abstract of JP 2005-48234, Feb. 24, 2005.

* cited by examiner

*Primary Examiner* — Dah-Wei Yuan
*Assistant Examiner* — Jose Hernandez-Diaz
(74) *Attorney, Agent, or Firm* — Greenblum & Bernstein P.L.C.

(57) ABSTRACT

A method of manufacturing a three-dimensionally shaped object by irradiating a metallic material with light beams, wherein the metallic material is supplied at a high density to increase the density and the strength of the three-dimensionally shaped object. The method of manufacturing a three-dimensionally shaped object comprises: an irradiation step of irradiating a metal mesh (2) formed of metal wires and a powder layer (3) formed of metal powder with light beams (L) to form a solidified layer or molten layer; and a laminating step of repeatedly performing the irradiation step for metal meshes to form a three-dimensionally shaped object. In the method, both of the metal mesh (2) and the metal powder are supplied in combination as the metallic material. Therefore, the method enables to supply the metallic material at a higher density compared to the case where metal powder is supplied alone, and enables to produce a three-dimensionally shaped object with higher dimensional accuracy, higher density and higher strength.

9 Claims, 13 Drawing Sheets

MANUFACTURING METHOD OF THREE-DIMENSIONALLY SHAPED OBJECT

TECHNICAL FIELD

The present invention relates to a manufacturing method of three-dimensionally shaped object by irradiating a metallic material with light beams.

BACKGROUND ART

A technique is known in the prior art in which a three-dimensionally shaped object is manufactured by irradiating a material layer formed of a metallic material with light beams (directional energy beams, for example, laser beams) to form a sintered layer or molten layer, and repeatedly performing the process of forming another material layer on the sintered layer or molten layer and irradiating it with light beams to form a sintered layer or molten layer. This technique has an advantage of enabling a complex three-dimensional object to be manufactured in a short time. If light beams with high energy density are used, the metallic material can be almost completely melted before being solidified. That is, after the melting, the material can be almost 100 percent dense. By finishing the surface of the dense shaped object, the finished object can have a smooth surface so as to be applied to a plastic mold or the like.

This technique called metal laser sintering typically uses a metallic material in powder form. Using metal powder as the material to be applied in layers can increase the surface area of the material and enhance the absorption of laser light. This enables the material to be sintered or melted even under conditions of low energy density irradiation, reducing the time required for shaping an object.

In order to obtain a shaped object having adequate strength, it is necessary not only to improve the strength of adhesion to a portion adjacent to a laser applied portion in a material layer irradiated with laser beams but also to improve the strength of adhesion between an irradiated portion and an underlying layer. When the material to be applied in layers is metal powder, laser light passes through the spaces between particles to reach the underlying layer. Thereby, the underlying layer is heated so that the adhesion strength can be improved.

Further, the upper surface of a portion irradiated with laser should not be raised so much. When another material layer is formed to shape a subsequent layer, if the swelling height is greater than the thickness of a layer of the metal powder, the formation itself of the material layer would be difficult.

Of course, the outside of a shaped object must not be cracked. It is also preferable to eliminate any micro crack in the internal structure.

A metallic material irradiated with laser is once melted partially or completely and then cooled and solidified into a shaped object. In the molten state, when the wettability is high, the area joined to an adjacent shaped portion becomes larger, and when the fluidity is high, the swelling becomes less. Therefore, higher fluidity and higher wettability in the molten state are desired.

In view of that, the applicant of this application has proposed a powder mixture for metal laser sintering that comprises iron group metal powder of chrome molybdenum steel, nickel powder, and phosphor copper or manganese copper powder. The chrome molybdenum steel powder is adopted due to its hardness and strength, the nickel powder is adopted due to its strength toughness, and workability, and the phosphor copper or manganese copper powder is adopted due to its wettability and fluidity.

It is difficult to manufacture a dense three-dimensionally shaped object by irradiating only iron group metal powder with laser. This is because it is difficult to join a subsequent layer to a previously formed layer of iron with no gap therebetween. Although chrome molybdenum steel itself is hard and excellent in mechanical strength, a three-dimensionally shaped object obtained by laser irradiation of chrome molybdenum steel powder alone is less dense and low in strength.

When the iron group metal powder is an alloy containing a high proportion of nickel component, the above mentioned problem is significant because a hard oxide film formed on the surface of the powder interferes with fusion of particles of the iron group metal powder. The inclusion of nickel in iron group metal has the advantage of being able to improve the toughness, strength, and corrosion resistance of the iron group metal. However, in the case where it is used for manufacturing a three-dimensionally shaped object by laser irradiation, the advantage is not utilized at all.

If a high energy laser is used, even iron group metal powder containing chrome molybdenum steel and a nickel component can be fused adequately. However, this has the drawback of requiring a large-scale laser device and requiring much power, thus increasing the manufacturing cost. Besides, since the laser scanning speed cannot be increased, the efficiency in manufacturing is decreased. Further, a shaped object formed with an excessive amount of irradiation energy is liable to be warped or deformed due to thermal stress.

Copper is a metallic material that is excellent in fluidity when melted, is excellent in wettability to an iron group material in the molten state, and hardly deteriorates in characteristics even when alloyed with an iron group material. When a powder mixture of iron group metal powder and copper alloy powder is irradiated with laser, the copper alloy is first melted to fill the spaces between particles of the iron group metal powder, and at the same time, this serves as a bonding material for fusion. In the case where a high energy laser is used, iron powder and copper alloy powder, which form a powder mixture, are totally melted into an alloy.

The fluidity of molten metal increases as the difference between the temperature in the molten state and the melting point increases. Phosphor copper alloy and manganese copper alloy have lower melting points than pure copper, and thus have higher fluidity than pure copper when they are irradiated with the same energy.

A conventional iron powder material for metal laser sintering contains nickel powder. As described above, when an alloy containing a nickel component is used as iron group metal powder, a hard oxide film formed on the surface of the powder interferes with fusion of the particles of the powder. However, in the case where nickel powder is mixed with a copper alloy separately from iron group metal powder, particles of these powders can be fused well. A hardened layer comprising an iron component, nickel, and a copper alloy component has a high sintered density, thus being tough and strong.

Especially, when 60 to 90 wt % of chrome molybdenum steel, 5 to 35 wt % of nickel powder, and 5 to 15 wt % of copper manganese alloy powder are contained, particularly desirable results can be obtained.

In metal laser sintering using the above mentioned metal powder material, generally desirable results have been obtained in that a complex three-dimensionally shaped object can be achieved by laser irradiation and formation of the layers.

However, a metal powder material cannot have a high filling density when the powder is applied uniformly in a thin layer. Therefore, unless the energy density of the laser radiation is increased, a dense shaped object cannot be obtained and thus the strength of a shaped object is low.

Further, when powder is melted or sintered by laser irradiation, the more space between the particles, the more shrinkage will occur. It remains as internal stress in the shaped object, and thus causes the shaped object to be liable to deformation and warpage and to be low in dimensional accuracy.

DISCLOSURE OF THE INVENTION

The present invention has been made to solve the above described problems. An object of the present invention is to provide a method of manufacturing a three-dimensionally shaped object that has high dimensional accuracy, high density, and high strength by supplying a metallic material densely.

For achieving the above mentioned purpose, the present invention provides a method of manufacturing a three-dimensionally shaped object by irradiating metallic material with light beams, comprising: an irradiation step of irradiating a metal mesh formed of metal wires and metal powder with light beams to form a solidified layer or molten layer; and a laminating step of forming solidified layers or molten layers by repeatedly performing the irradiation step for metal meshes and metal powder so as to form a three-dimensionally shaped object.

According to the present invention, since both of the metal mesh and the metal powder are supplied in combination as the metallic material, the metallic material can be supplied densely as compared to the case where metal powder is supplied alone. This enables a three-dimensionally shaped object to be manufactured with high dimensional accuracy and with high density and high strength. Further, the material is easy to handle and resistant to segregation.

It is preferable that wire diameters of the metal wires be between 0.01 and 0.1 mm. This can reduce the thickness of each layer of the metallic material so that the three-dimensionally shaped object can be manufactured with high dimensional accuracy. Since the wire diameters of the metal wires are not excessively small, the metal wires are less likely to be scattered when irradiated with light beams.

It is preferable that distance between the metal wires in the metal mesh be between 0.01 and 0.1 mm. Since there are spaces between the metal wires, light beams can pass between the metal wires and reach an underlying solidified layer to heat the underlying solidified layer and an adjacent solidified layer. Thereby, the adhesive strength between the underlying solidified layer and the adjacent solidified layer can be improved.

It is preferable that a mean particle diameter of the metal powder be between 1 and 100 μm. Since the mean particle diameter of the metal powder is small, the spaces between the metal wires in the metal mesh can be filled with the metal powder. Further, the mean particle diameter of the metal powder is 1 μm or more. This can prevent dispersion of the metal powder during operations, so that the metal powder is easy to handle. Besides, the metal powder has a high fluidity so that the spaces between the metal wires in the metal mesh can be densely filled with particles of the metal powder.

It is preferable that the metal mesh have an iron group metal wire, a nickel wire and/or a nickel alloy wire, and a copper wire and/or a copper alloy wire, and that the metal powder have iron group metal powder, nickel powder and/or nickel alloy powder, and copper powder and/or copper alloy powder. This can reduce swelling of a solidified layer so that a subsequent metal mesh to be laid can be located precisely.

It is preferable that the metal mesh have 60 to 90 wt % of iron group metal wires, 5 to 35 wt % of nickel wires and/or nickel alloy wires, and 5 to 15 wt % of copper wires and/or copper alloy wires, and that the metal powder contain 60 to 90 wt % of iron group metal powder, 5 to 35 wt % of nickel powder and/or nickel alloy powder, and 5 to 15 wt % of copper powder and/or copper alloy powder. This can prevent cracks in the outside and micro cracks in the internal structure of a three-dimensionally shaped object manufactured.

It is preferable that the metal mesh have a stack of a metal mesh of iron group metal wires, a metal mesh of nickel wires and/or nickel alloy wires, and a metal mesh of copper wires and/or copper alloy wires. Since different types of metal meshes, each of which is formed from metal wires made of one type of material, are used in combination instead of using a metal mesh formed from metal wires made of different materials, the cost for the metal meshes can be reduced. Further, swelling of a solidified layer can be reduced so that a subsequent metal mesh to be laid can be located precisely.

It is preferable that the metallic material including the metal mesh and the metal powder contain, in total, 60 to 90 wt % of iron, 5 to 35 wt % of nickel, and 5 to 15 wt % of copper. This can reduce swelling of a solidified layer, and further can prevent cracks in the outside and micro cracks in the internal structure of a three-dimensionally shaped object manufactured.

It is preferable that the method further comprise a cutting step of, after the solidified layers or molten layers are formed, cutting and removing a surface part and/or an unwanted part of a three-dimensionally shaped object already obtained by forming the layers. This can improve the surface roughness of a three-dimensionally shaped object manufactured and thus improve the dimensional accuracy.

BEST MODES FOR CARRYING OUT THE INVENTION

First Embodiment

Figure 1:
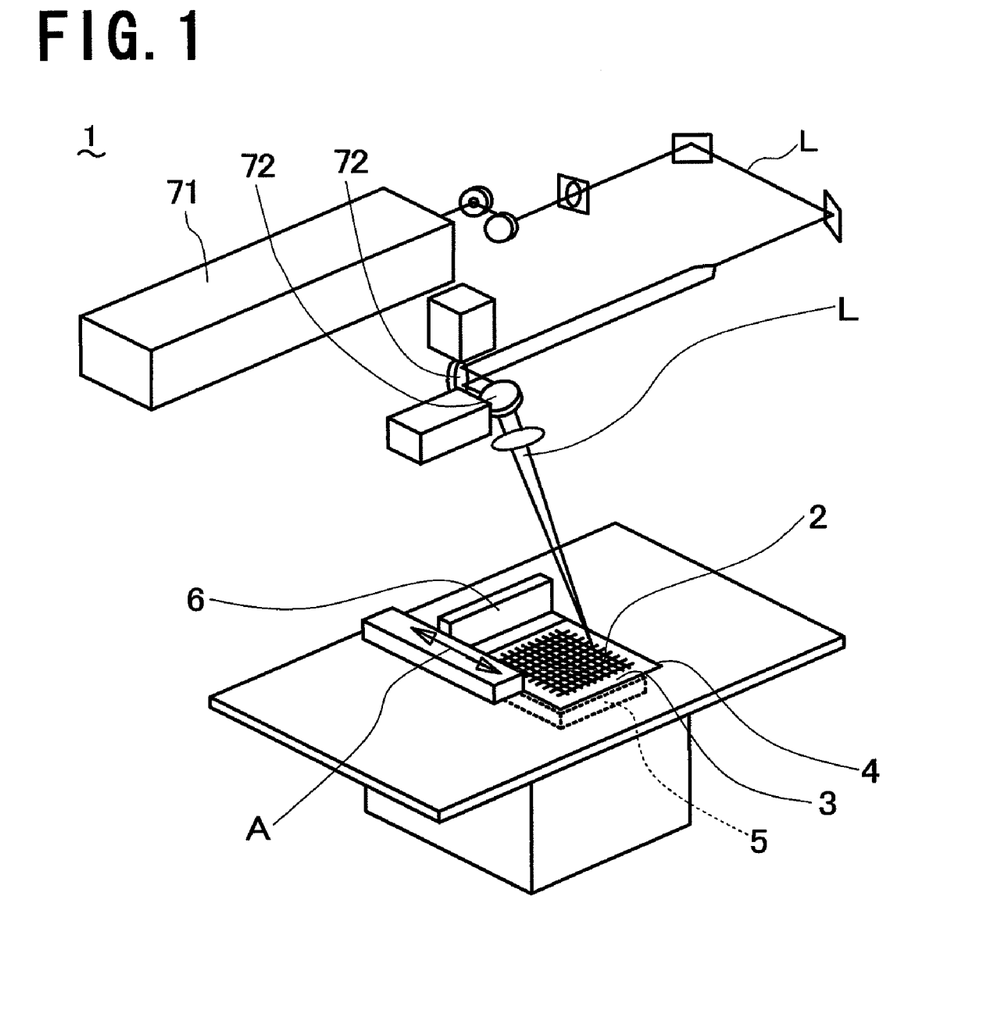
FIG. 1 is a perspective view of equipment for metal-laser sintering process that is used for a manufacturing method according to a first embodiment of the present invention.
Figure 2:
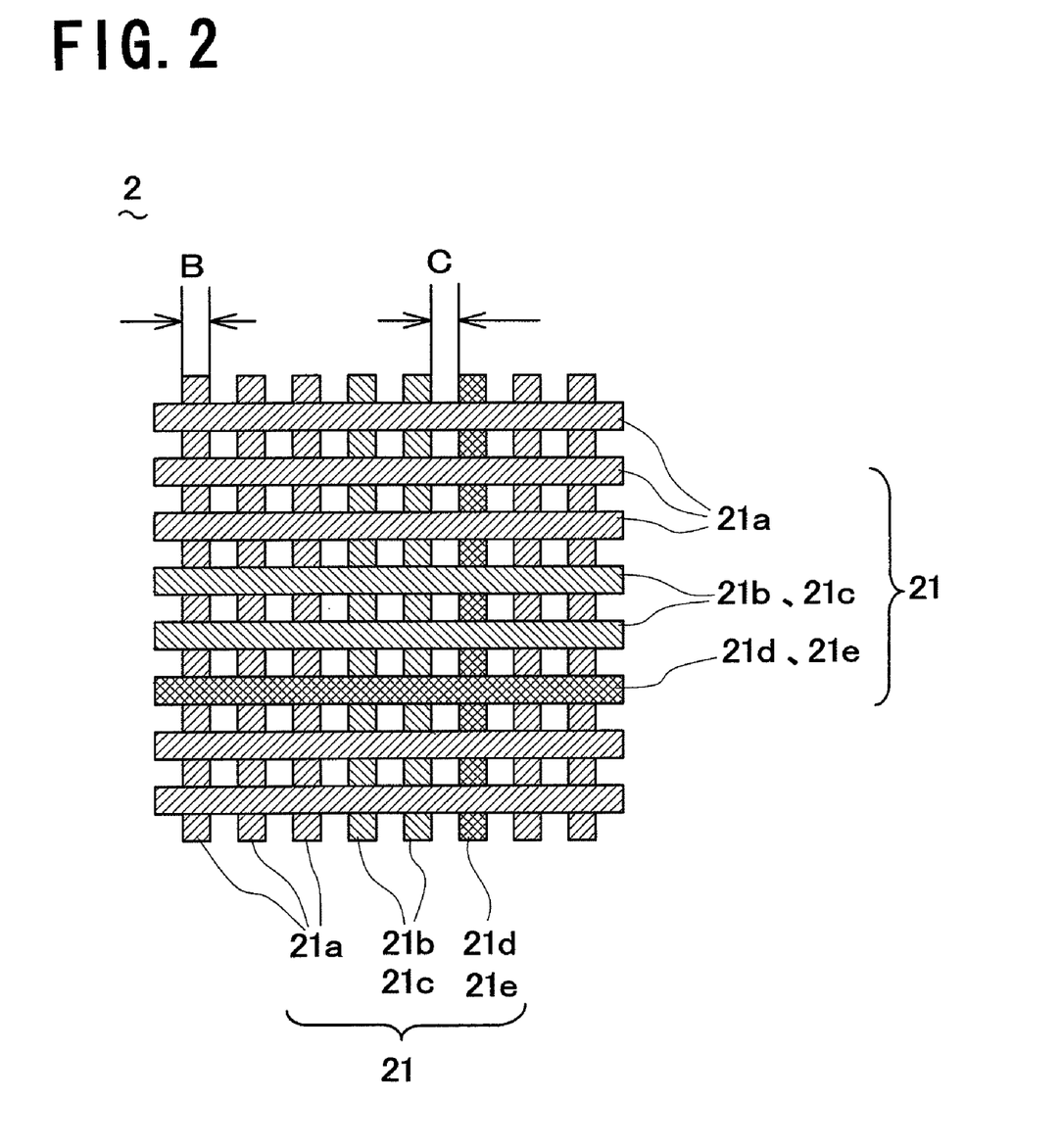
FIG. 2 shows the configuration of a metal mesh for use in the manufacturing method.
Figure 3:
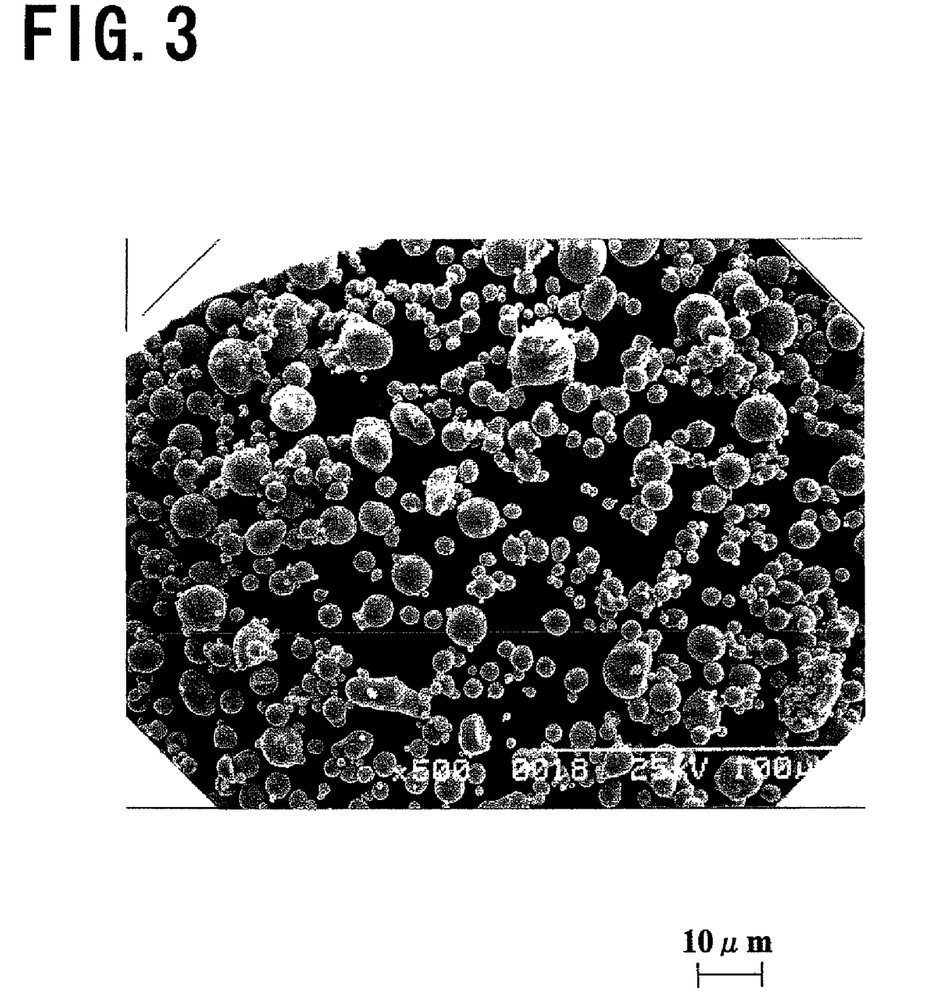
FIG. 3 is an SEM photograph of metal powder for use in the manufacturing method.

Referring to the drawings, a manufacturing method of three-dimensionally shaped object according to a first embodiment of the present invention is described. FIG. 1 shows the configuration of equipment for metal-laser sintering process used for manufacturing a three-dimensionally shaped object. FIG. 2 shows the configuration of a metal mesh used as a material. FIG. 3 shows an SEM photograph of metal powder used as a material. The equipment for metal-laser sintering process 1 comprises: a substrate 4 on which the metal mesh 2 as a material is placed and a powder layer 3 of metal powder is applied; a table 5 that holds the substrate 4 and moves up and down; a wiper 6 that supplies the metal powder to the substrate 4 and moves in a direction shown by arrow A to form the powder layer 3; a light beam oscillator 71 that emits light beams L; a galvanometer mirror 72 that directs the light beams L onto the metal mesh 2 and the powder layer 3 for scanning. The light beam oscillator 71 is a carbon dioxide laser, a fiber laser, or the like.

The metal mesh 2 comprises metal wires 21 arranged lengthwise and crosswise. The metal wires 21 are joined to each other by electric welding. The wire diameter B of a metal wire 21 is 0.01 to 0.1 mm while the distance C between the metal wires 21 is 0.01 to 0.1 mm. The metal wires 21 include iron group metal wires 21a, nickel wires 21b and/or nickel alloy wires 21c, and copper wires 21d and/or copper alloy wires 21e. The weight percentage of the iron group metal wires 21a is 60 to 90 wt %, the weight percentage of the nickel wires 21b and/or the nickel alloy wires 21c is 5 to 35 wt %, and the weight percentage of the copper wires 21d and/or the copper alloy wires 21e is 5 to 15 wt %.

The particles of the metal powder are substantially spherical in shape and have a mean diameter of 1 to 100 μm. The metal powder comprises iron group metal powder, nickel powder and/or nickel alloy powder, and copper powder and/or copper alloy powder. The weight percentage of the iron group metal powder is 60 to 90 wt %, the weight percentage of the nickel powder and/or the nickel alloy powder is 5 to 35 wt %, and the weight percentage of the copper powder and/or the copper alloy powder is 5 to 15 wt %.

Figure 4:
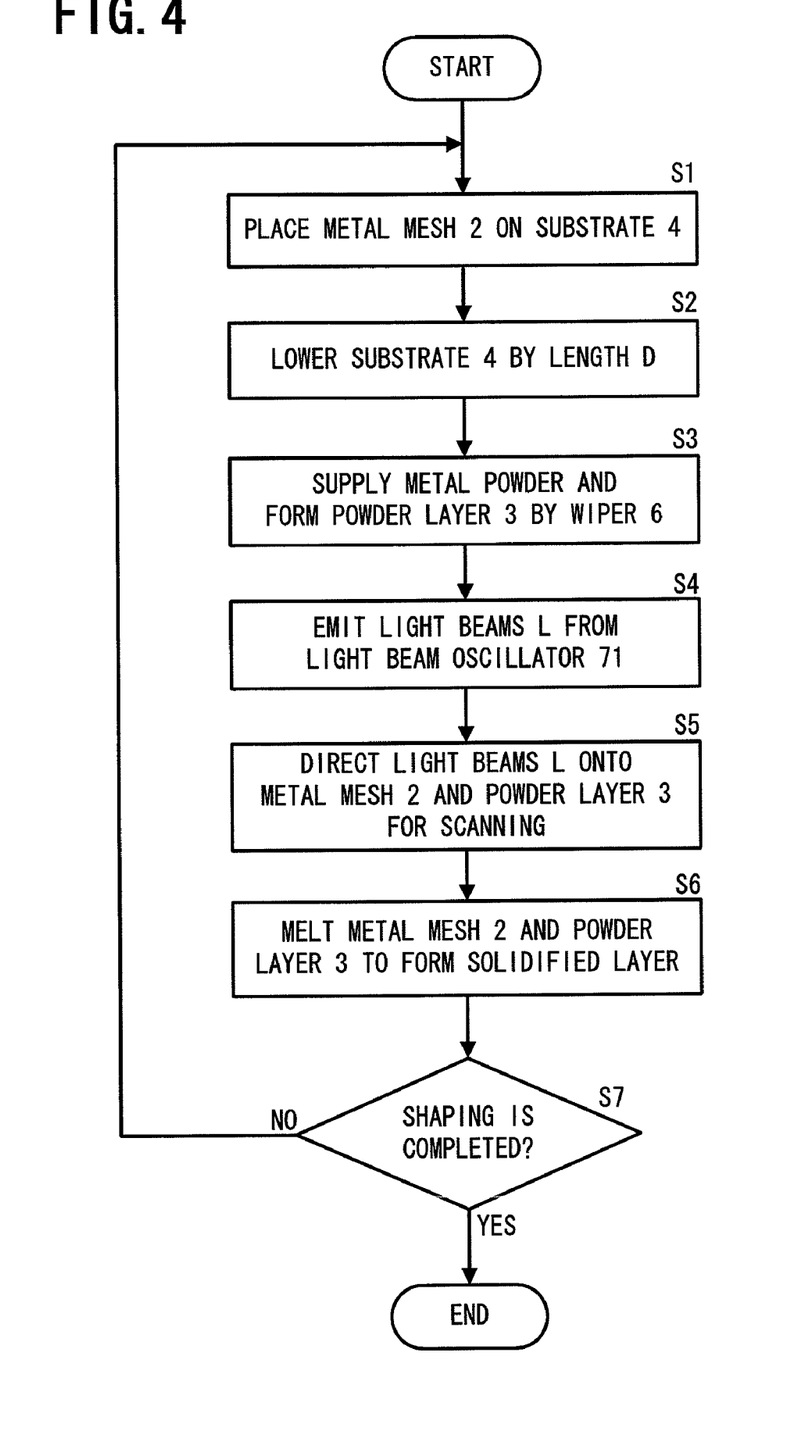
FIG. 4 is a flowchart of the manufacturing method.
Figure 5:
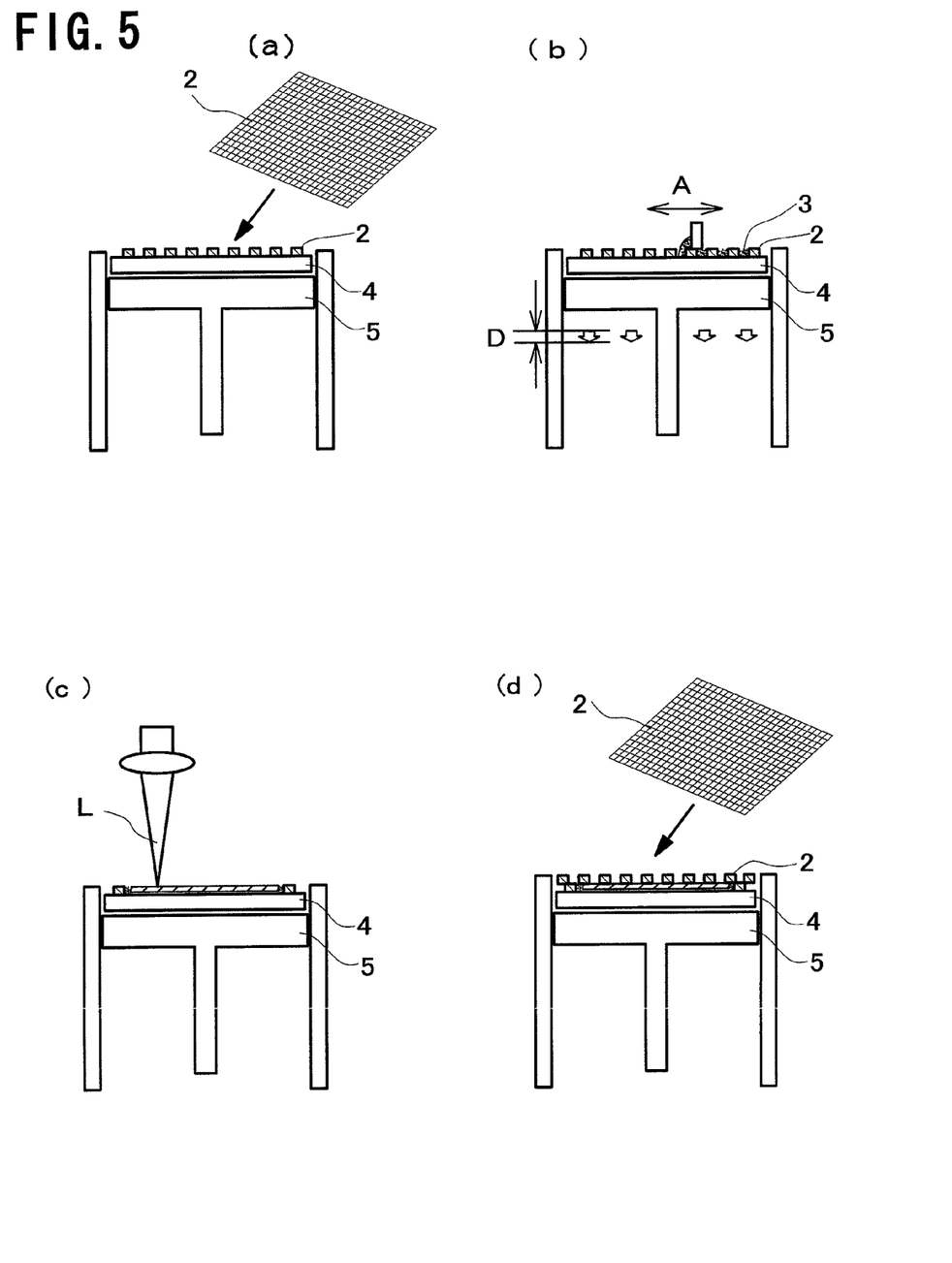
FIG. 5 illustrates the manufacturing method in sequence.
Figure 6:
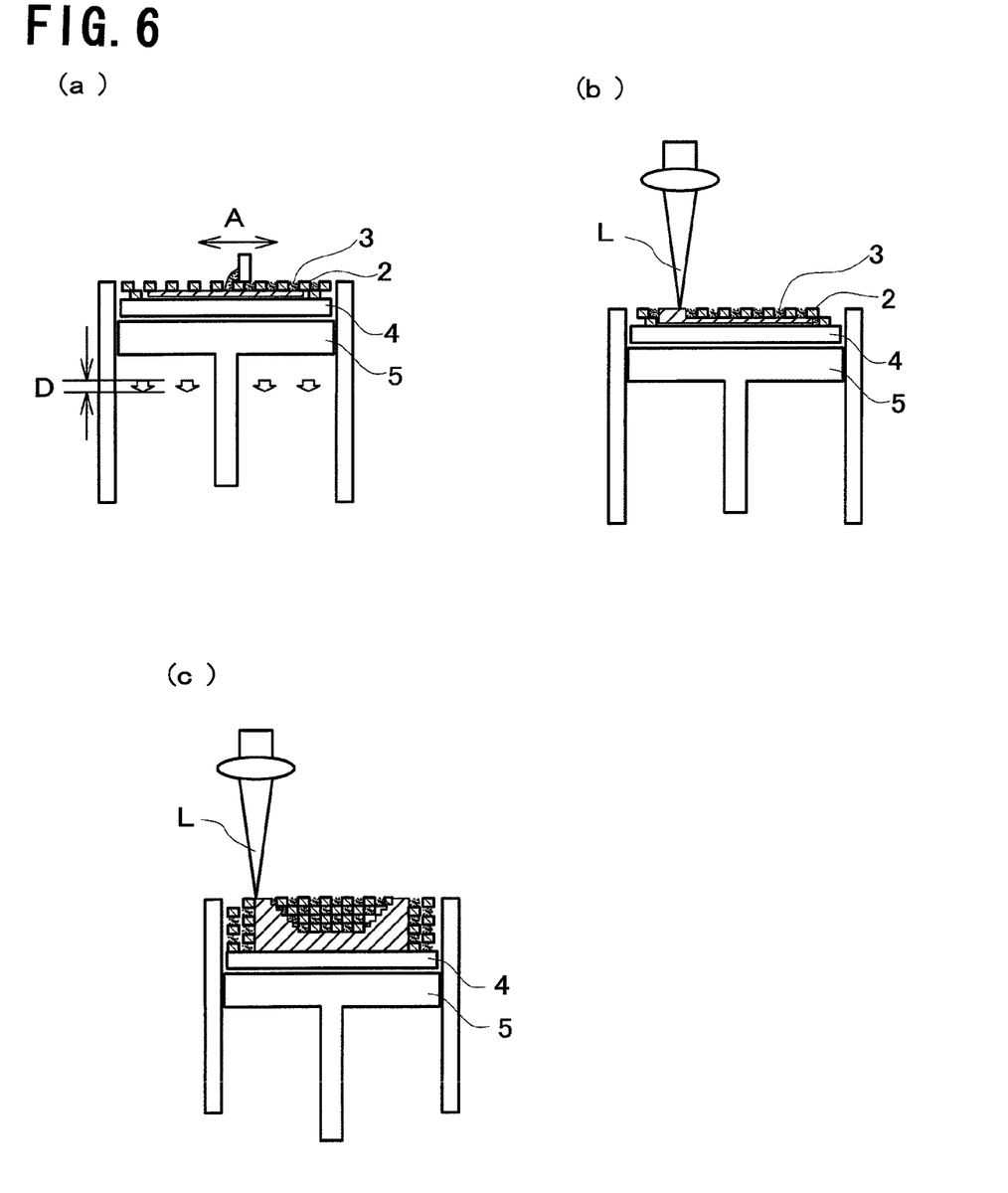
FIG. 6 illustrates the manufacturing method in sequence.

FIG. 4 shows a flowchart of the manufacturing method according to this embodiment. FIG. 5 and FIG. 6 show operations in this manufacturing method. First, the metal mesh 2 is placed on the substrate 4 (S1) (see FIG. 5(a)). The substrate 4 is lowered by the length D corresponding to the thickness of the powder layer 3 to be formed (S2). The metal powder is supplied to the substrate 4, and the wiper 6 is moved in the direction shown by arrow A to fill the spaces between the metal wires in the metal mesh 2 with the metal powder and thereby form the powder layer 3 (S3) (see FIG. 5(b)). Light beams L are emitted from the light beam oscillator 71 (S4), and directed to an arbitrary location on the metal mesh 2 and the powder layer 3 by the galvanometer mirror 72 for scanning (S5). The metal mesh 2 and the powder layer 3 are melted and solidified to form a solidified layer integrated with the substrate 4 (S6) (see FIG. 5(c)). These steps S1 to S6 constitute an irradiation step. Then, whether shaping is completed or not is determined (S7), and the steps S1 to S6 are repeated until the shaping is completed (see FIGS. 5(d), 6(a), and 6(b)). The steps S1 to S7 constitute a laminating step. By forming solidified layers in such a manner, a three-dimensionally shaped object is manufactured (see FIG. 6(c)).

The irradiation path of light beams L is prepared based on three dimensional CAD data in advance. Contour shape data on each section obtained by slicing at a regular pitch STL data created from a three dimensional CAD model is used. When outer portions as contours of a shaped object are irradiated with light beams L, the diameters of focused light beams L can be reduced so as to separate the metal mesh 2 from the shaped object. Thereby, a finished three-dimensionally shaped object can be easily removed. Further, it is preferable that the irradiation with light beams L be performed under an inert atmosphere or a reducing atmosphere. Especially for manufacturing a dense three-dimensionally shaped object, an inert atmosphere or a reducing atmosphere is necessary.

In the above described manufacturing method, since both of the metal mesh 2 and the metal powder are supplied in combination as the metallic material, the metallic material can be supplied densely as compared to the case where metal powder is supplied alone. This enables a three-dimensionally shaped object to be manufactured with high dimensional accuracy and with high density and high strength. As compared to metal powder alone, the material is easy to handle and resistant to segregation. Further, since the metal wires of the metal mesh 2 are thin, the thickness of each layer of the metallic material can be reduced so that the three-dimensionally shaped object can be manufactured with high dimensional accuracy. Since the wire diameters of the metal wires are not excessively small, the metal wires are less likely to be scattered when irradiated with light beams. Further, there are spaces between the metal wires in the metal mesh 2, so that light beams L pass between the metal wires and reach an underlying solidified layer to heat the underlying solidified layer and an adjacent solidified layer. Thereby, the adhesive strength between the underlying solidified layer and the adjacent solidified layer can be improved.

Since the mean diameter of the particles of the metal powder is small, the spaces between the metal wires in the metal mesh 2 can be filled with the metal powder. Further, the mean particle diameter of the metal powder is 1 μm or more. This can prevent dispersion of the metal powder during operations, so that the metal powder is easy to handle. Besides, the metal powder has a high fluidity so that the spaces between the metal wires in the metal mesh 2 can be densely filled with particles of the metal powder.

Since the metal mesh 2 comprises the iron group metal wires 21a, the nickel wires 21b and/or the nickel alloy wires 21c, and the copper wires 21d and/or the copper alloy wires 21e, and the powder layer 3 comprises the iron group metal powder, the nickel powder and/or the nickel alloy powder, and the copper powder and/or the copper alloy powder, swelling of a solidified layer can be reduced so that a subsequent metal mesh to be laid can be located precisely. Further, the above described proportions of the metal wires in the metal mesh 2 and of the metal powders in the powder layer 3 can prevent cracks in the outside and micro cracks in the internal structure of a three-dimensionally shaped object manufactured.

Figure 7:
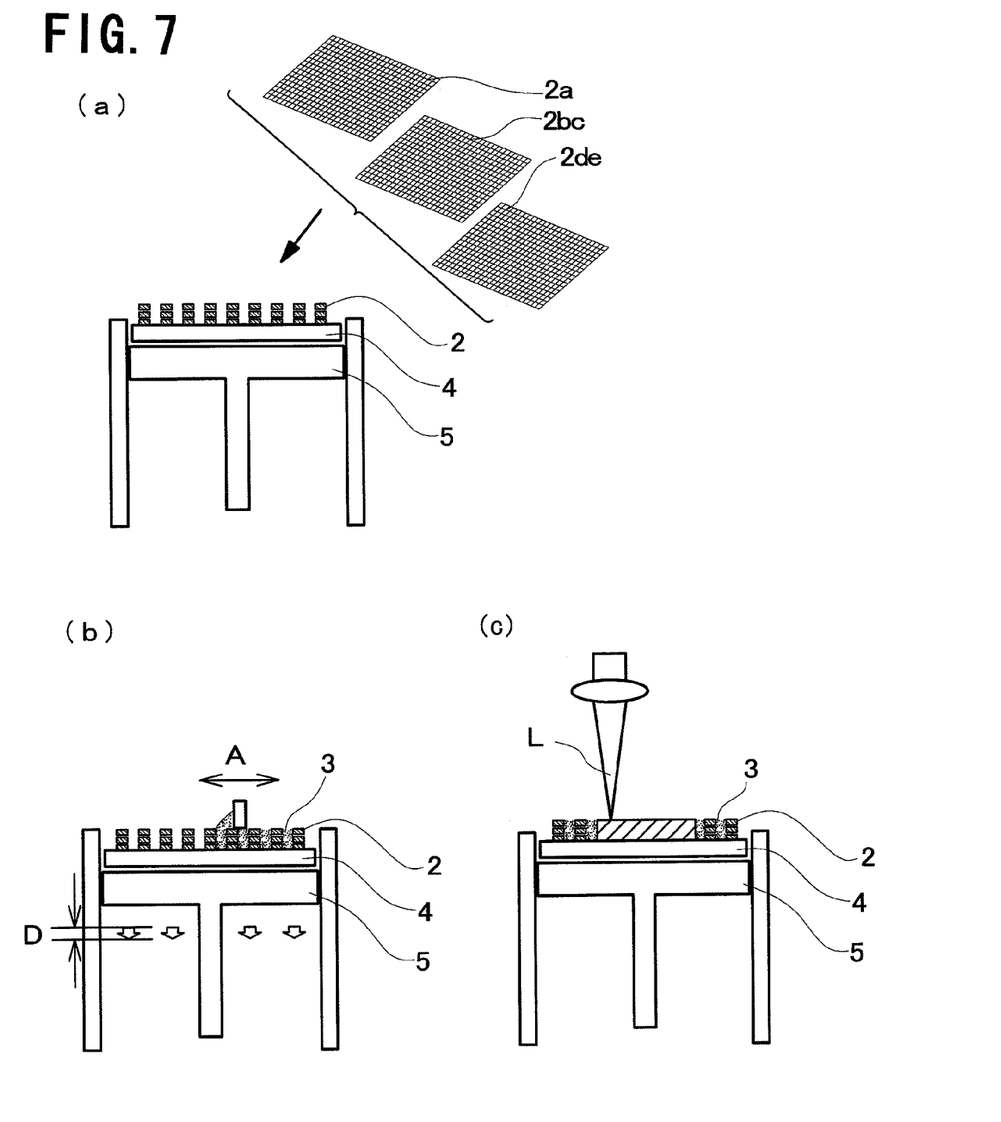
FIG. 7 illustrates a modification of the manufacturing method.

A metal mesh 2 as a material of a three-dimensionally shaped object may be prepared for each of the types of the metal wires 21. FIG. 7 shows a manufacturing method using a metal mesh 2 for each of the types of the metal wires 21. A metal mesh 2a formed from iron group metal wires 21a, a metal mesh 2bc formed from nickel wires 21b and/or nickel alloy wires 21c, and a metal mesh 2de formed from copper wires 21d and/or copper alloy wires 21e are placed in a stack on the substrate 4 (see FIG. 7(a)). Then, a powder layer 3 is formed by the wiper 6 (see FIG. 7(b)), and irradiation with light beams L is performed to form a three-dimensionally shaped object (see FIG. 7(c)). The metal meshes 2 are combined so as to have 60 to 90 wt % of iron group metal wires 21a, 5 to 35 wt % of nickel wires 21b and/or nickel alloy wires 21c, and 5 to 15 wt % of copper wires 21d and/or copper alloy wires 21e. Since different types of metal meshes, each of which is formed from metal wires made of one type of material, are used in combination instead of using a metal mesh formed from metal wires made of different materials, the cost for the metal meshes can be reduced. Further, the proportions of the materials can be easily varied.

It is also possible to select the proportions of the metals in the metal mesh 2 and the metal powder so that the metallic material including the metal mesh 2 and the metal powder contains, in total, 60 to 90 wt % of iron, 5 to 35 wt % of nickel, and 5 to 15 wt % of copper. This can reduce swelling of a solidified layer so that a subsequent metal mesh to be laid can be located precisely, and further can prevent cracks in the outside and micro cracks in the internal structure of a three-dimensionally shaped object manufactured.

Second Embodiment

Figure 8:
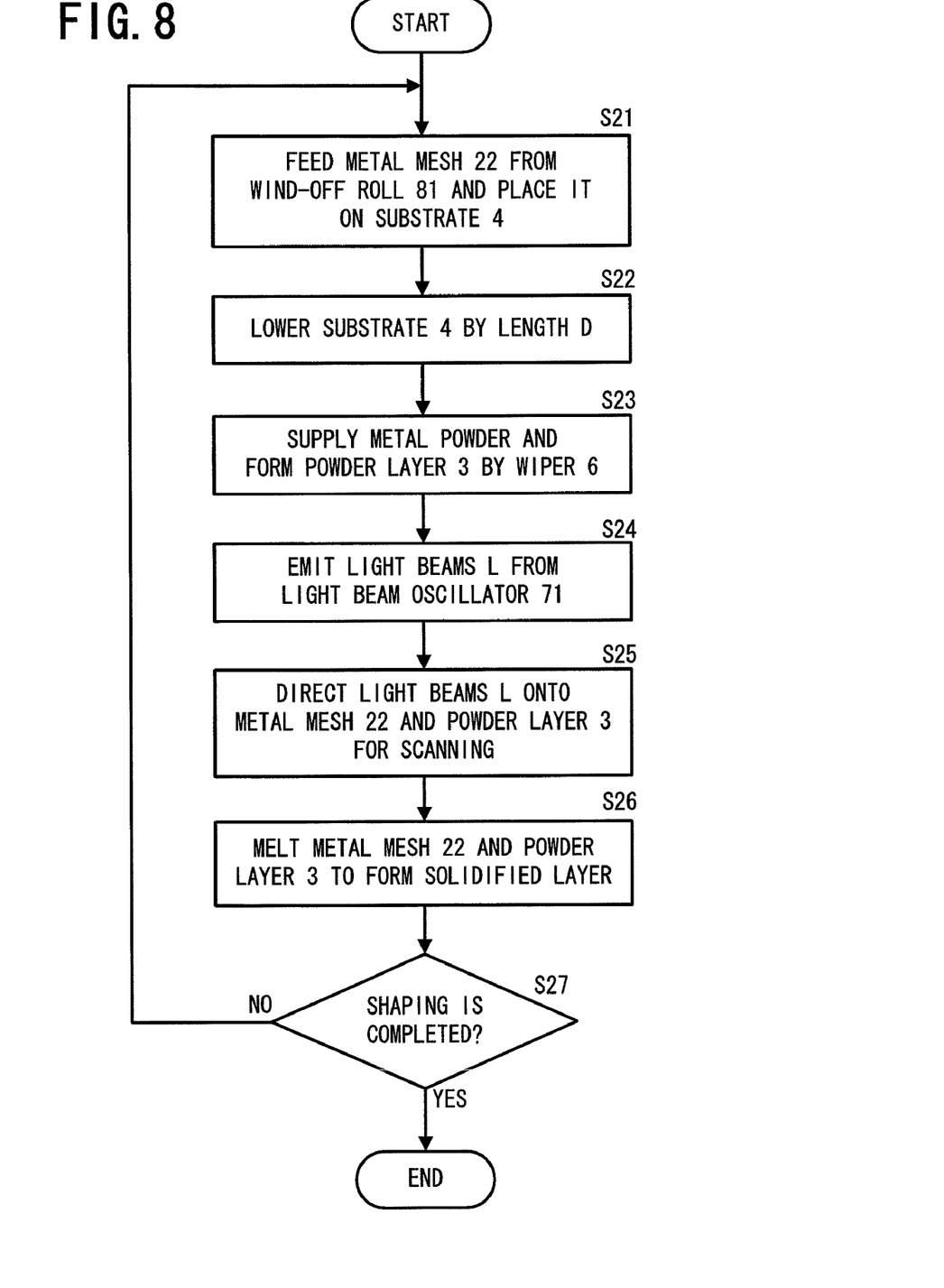
FIG. 8 is a flowchart of a manufacturing method according to a second embodiment of the present invention.
Figure 9:
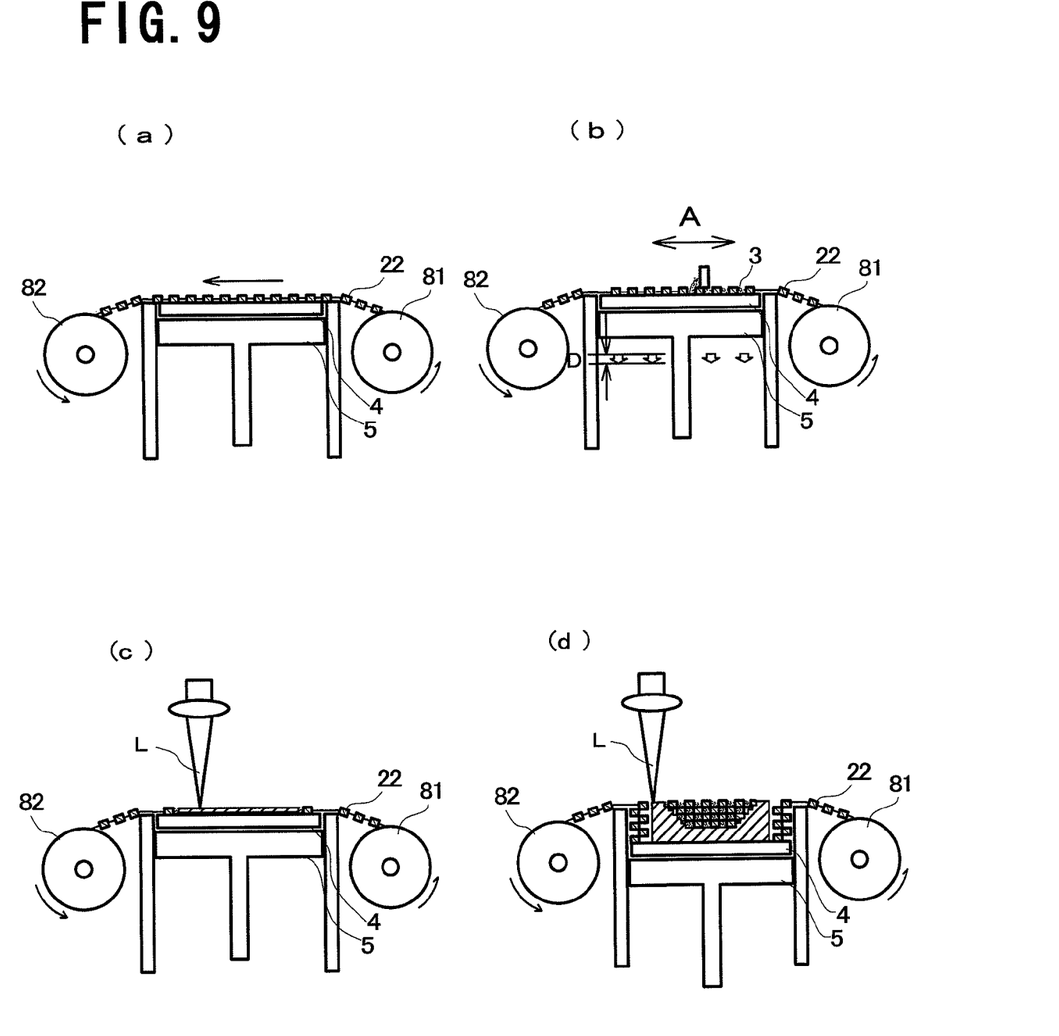
FIG. 9 illustrates the manufacturing method in sequence.

A manufacturing method of three-dimensionally shaped object according to a second embodiment of the present invention is described. FIG. 8 shows a flowchart of the manufacturing method according to this embodiment. FIG. 9 shows operations in this manufacturing method. In this embodiment, a metal mesh 22 is long and wound on a wind-off roll 81, and the wind-off roll 81 and a wind-up roll 82 are set on both sides of equipment for metal-laser sintering process 1.

First, a length of metal mesh 22 needed for laser sintering is directed from the wind-off roll 81 to the wind-up roll 82 so as to be placed on a substrate 4 (S21) (see FIG. 9(a)). The substrate 4 is lowered by the length D corresponding to the thickness of a powder layer 3 to be formed (S22). Metal powder is supplied to the substrate 4, and a wiper 6 is moved in the direction shown by arrow A to fill the spaces between metal wires in the metal mesh 22 with the metal powder and thereby form the powder layer 3 (S23) (see FIG. 9(b)). Light beams L are emitted from a light beam oscillator 71 (S24), and directed to an arbitrary location on the metal mesh 22 by a galvanometer mirror 72 for scanning (S25). The metal mesh 22 and the powder layer 3 are melted and solidified to form a solidified layer integrated with the substrate 4 (S26) (see FIG. 9(c)). At this time, the metal mesh 2 is separated from the shaped object with light beams L. Then, whether shaping is completed or not is determined (S27), and the steps S21 to S26 are repeated until it is determined that the shaping is completed. By forming solidified layers in such a manner, a three-dimensionally shaped object is manufactured (see FIG. 9(c)). Since the metal mesh 22 can be supplied easily, the cost can be reduced.

Figure 10:
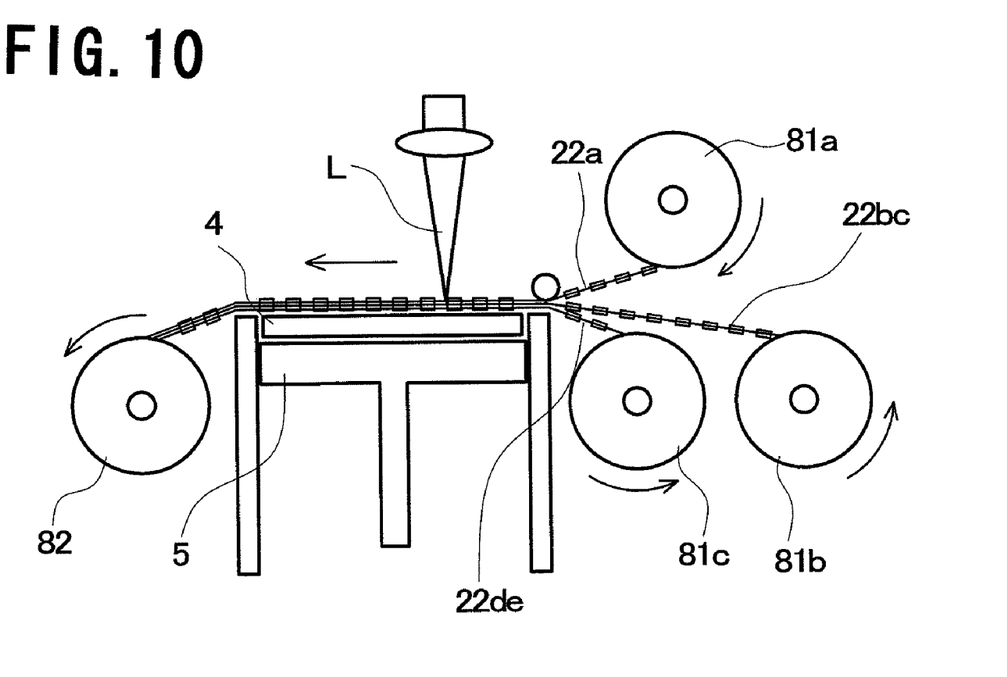
FIG. 10 illustrates a modification of the manufacturing method

It is also possible to prepare a metal mesh 22, which is a material of a three-dimensionally shaped object, for each of the types of the metal wires 21. FIG. 10 shows a manufacturing method using a metal mesh 2 for each of the types of the metal wires 21. A metal mesh 22a of iron group metal wires 21a is fed from a wind-off roll 81a, a metal mesh 22bc of nickel wires 21b and/or nickel alloy wires 21c is fed from a wind-off roll 81b, and a metal mesh 22de of copper wires 21d and/or copper alloy wires 21e is fed from a wind-off roll 81c. These metal meshes are placed in a stack on the substrate 4, and wound up on a wind-up roll 82. Since the metal meshes 22 can be easily prepared, the cost can be reduced. Further, the proportions of the materials can be easily varied.

Third Embodiment

Figure 11:
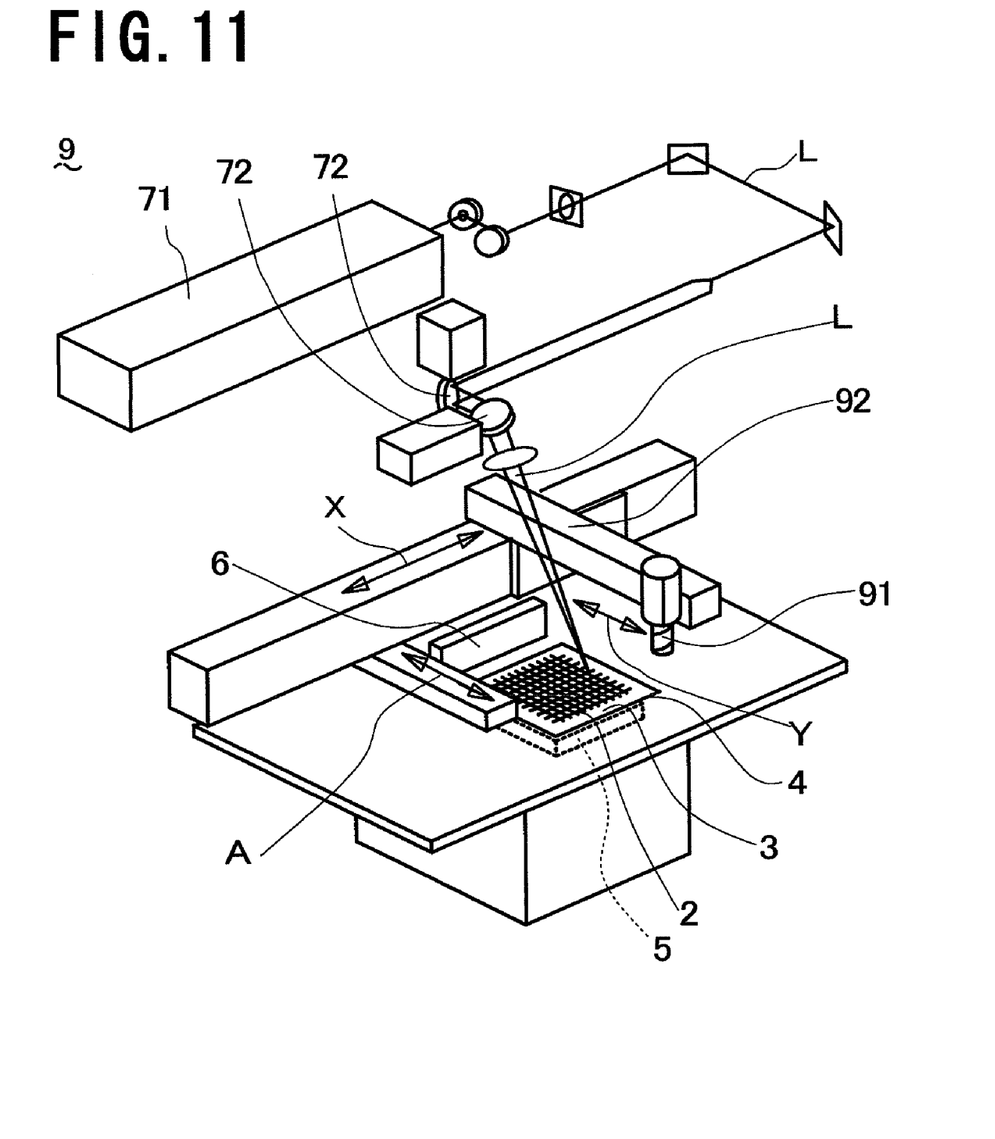
FIG. 11 is a perspective view of equipment for metal-laser sintering process that is used for a manufacturing method according to a third embodiment of the present invention.

A manufacturing method of three-dimensionally shaped object according to a third embodiment of the present invention is described. The manufacturing method of three-dimensionally shaped object according to this embodiment comprises a step of cutting a surface of a shaped object in addition to the manufacturing method according to the first embodiment. FIG. 11 shows the configuration of a complex machine of equipment for metal-laser sintering process 8 for use in the manufacturing method according to this embodiment. The complex machine of equipment for metal-laser sintering process 8 has a milling head 91 for cutting the surface of a shaped object and an X-Y driving mechanism 92 for moving the milling head 91 to a portion to be cut, in addition to the equipment for metal-laser sintering process 1 according to the first embodiment. A tool (ball end mill) 0.6 mm in diameter (1 mm in effective cutting length) is used for the milling head 91. The milling head 91 is activated when solidified layers reach a thickness of 0.5 mm.

Figure 12:
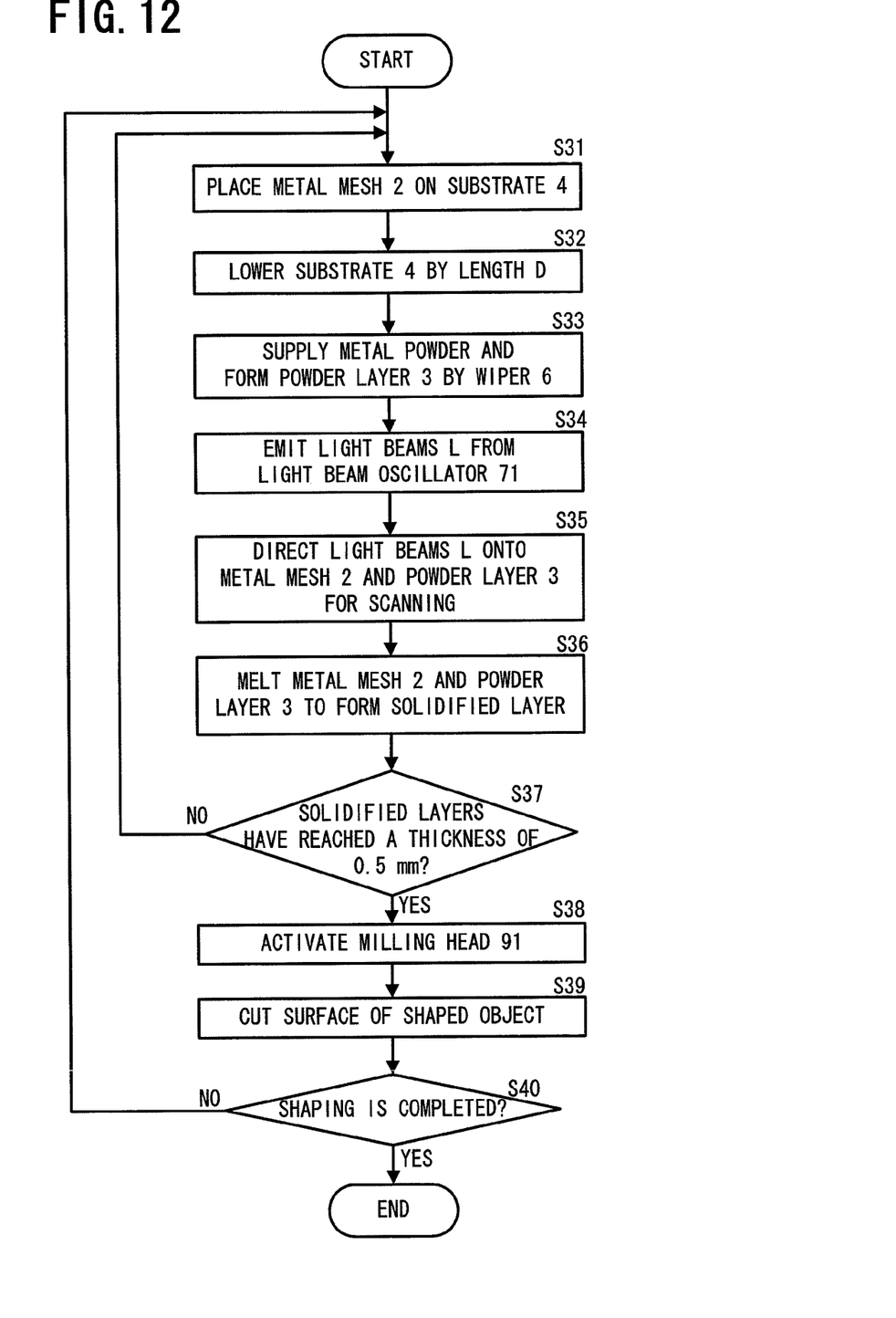
FIG. 12 is a flowchart of the manufacturing method.
Figure 13:
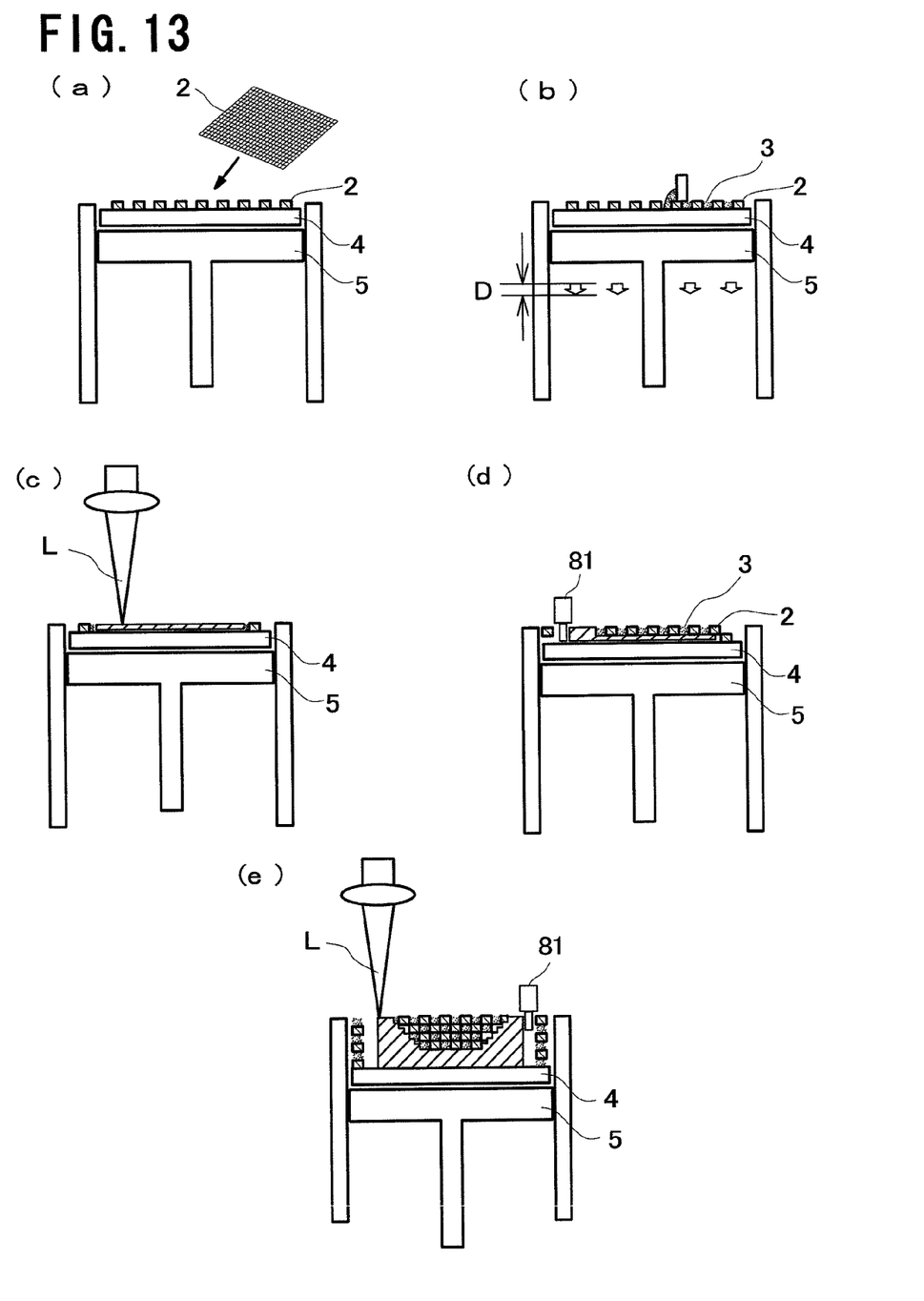
FIG. 13 illustrates the manufacturing method in sequence.

FIG. 12 shows a flowchart of the manufacturing method according to this embodiment. FIG. 13 shows operations in this manufacturing method 8. First, a metal mesh 2 is placed on a substrate 4 (S31) (see FIG. 13(a)). The substrate 4 is lowered by the length D corresponding to the thickness of a powder layer 3 to be formed (S32). Metal powder is supplied to the substrate 4, and a wiper 6 is moved in the direction shown by arrow A to fill the spaces between metal wires in the metal mesh 2 with the metal powder and thereby form the powder layer 3 (S33) (see FIG. 13(b)). Light beams L are emitted from a light beam oscillator 71 (S34), and directed to an arbitrary location on the metal mesh 2 and the powder layer 3 by a galvanometer mirror 72 for scanning (S35). The metal mesh 2 and the powder layer 3 are melted and solidified to form a solidified layer integrated with the substrate 4 (S36) (see FIG. 13(c)). Whether or not solidified layers have reached a thickness of 0.5 mm is determined (S37), and the steps S31 to S36 are repeated to form solidified layers until the solidified layers reach a thickness of 0.5 mm.

When solidified layers formed reach a thickness of 0.5 mm, the milling head 91 is activated (S38). The milling head 91 is moved in the direction shown by arrow X and in the direction shown by arrow Y by the X-Y driving mechanism 92 so as to cut the surface of the shaped object obtained by forming the solidified layers (S39) (see FIG. 13(d)). These steps S38 and S39 constitute a cutting step. Subsequently, whether the shaping of a three-dimensionally shaped object is completed or not is determined (S40), and when it is determined that the shaping is not completed, the process returns to the powder layer forming step (S31). In such a manner, by repeating the steps S31 to S39 to form solidified layers, a three-dimensionally shaped object is manufactured (see FIG. 13(e)). This can improve the surface roughness of a three-dimensionally shaped object manufactured and thus improve the dimensional accuracy.

In addition, the present invention is not limited to the configurations of the above mentioned embodiments, and various kinds of modification can be done in a scope without changing the purpose of the present invention. For example, a metal mesh 2 may be formed by weaving metal wires 21 or by crimping metal wires 21. A metal mesh 2 may have a combination of metal wires 21 in three different orientations instead of in the two orientations. The particles of metal powder may be rod like or plate like instead of being substantially spherical. In the case where the particles of metal powder is not substantially spherical, the particle diameter means the maximum overall length of a particle that is measured by microscopy.

This application involves claim of priority based on Japan Patent Application No. 2006-346498. Entirety of description of the application is incorporated in this application by reference.

The invention claimed is:
1. A method of manufacturing a three-dimensionally shaped object by irradiating metallic material with light beams, comprising:

an irradiation step of irradiating a metal mesh formed of metal wires and metal powder with light beams to form a solidified layer or molten layer; and a laminating step of forming solidified layers or molten layers by repeatedly performing the irradiation step for metal meshes and metal powder so as to form a three-dimensionally shaped object.

2. The method of manufacturing a three-dimensionally shaped object according to claim 1, wherein wire diameters of the metal wires are between 0.01 and 0.1 mm.

3. The method of manufacturing a three-dimensionally shaped object according to claim 1, wherein distance between the metal wires in the metal mesh is between 0.01 and 0.1 mm.

4. The method of manufacturing a three-dimensionally shaped object according to claim 1, wherein a mean particle diameter of the metal powder is between 1 and 100 μm.

5. The method of manufacturing a three-dimensionally shaped object according to claim 1, wherein the metal mesh has an iron group metal wire, a nickel wire and/or a nickel alloy wire, and a copper wire and/or a copper alloy wire, and the metal powder has iron group metal powder, nickel powder and/or nickel alloy powder, and copper powder and/or copper alloy powder.

6. The method of manufacturing a three-dimensionally shaped object according to claim 5, wherein the metal mesh has 60 to 90 wt % of iron group metal wires, 5 to 35 wt % of nickel wires and/or nickel alloy wires, and 5 to 15 wt % of copper wires and/or copper alloy wires, and the metal powder contains 60 to 90 wt % of iron group metal powder, 5 to 35 wt % of nickel powder and/or nickel alloy powder, and 5 to 15 wt % of copper powder and/or copper alloy powder.

7. The method of manufacturing a three-dimensionally shaped object according to claim 5, wherein the metal mesh has a stack of a metal mesh of iron group metal wires, a metal mesh of nickel wires and/or nickel alloy wires, and a metal mesh of copper wires and/or copper alloy wires.

8. The method of manufacturing a three-dimensionally shaped object according to claim 5, wherein the metallic material including the metal mesh and the metal powder contains, in total, 60 to 90 wt % of iron, 5 to 35 wt % of nickel, and 5 to 15 wt % of copper.

9. The method of manufacturing a three-dimensionally shaped object according to claim 1, further comprising a cutting step of, after the solidified layers or molten layers are formed, cutting and removing a surface part and/or an unwanted part of a three-dimensionally shaped object already obtained by forming the layers.

* * * * *